US007543851B2

(12) United States Patent
Wolfram et al.

(10) Patent No.: US 7,543,851 B2
(45) Date of Patent: Jun. 9, 2009

(54) MOBILE CONCRETE PUMP WITH DISTRIBUTING BOOM

(75) Inventors: Markus Wolfram, Nürtingen (DE); Dieter Alwes, Aichtal (DE); Michael H. Clement, Badenhard (DE); Bernhard Raschke, Bempflingen (DE)

(73) Assignee: Putzmeister Concrete Pumps GmbH, Aichwald (DE)

( * ) Notice: Subject to any disclaimer, the term of this patent is extended or adjusted under 35 U.S.C. 154(b) by 420 days.

(21) Appl. No.: 10/560,314

(22) PCT Filed: Jun. 4, 2004

(86) PCT No.: PCT/EP2004/006038

§ 371 (c)(1),
(2), (4) Date: Dec. 9, 2005

(87) PCT Pub. No.: WO2004/113648

PCT Pub. Date: Dec. 29, 2004

(65) Prior Publication Data

US 2006/0140783 A1 Jun. 29, 2006

(30) Foreign Application Priority Data

Jun. 25, 2003 (DE) ................................ 103 28 770

(51) Int. Cl.
*B62D 53/00* (2006.01)
*B60S 9/00* (2006.01)
*B66C 23/44* (2006.01)

(52) U.S. Cl. ................. 280/766.1; 280/404; 280/763.1; 212/181

(58) Field of Classification Search ................. 280/404, 280/423.1, 766.1; 212/180, 181
See application file for complete search history.

(56) References Cited

U.S. PATENT DOCUMENTS

| | | | | |
|---|---|---|---|---|
| 3,224,597 | A * | 12/1965 | Whitmire | 212/294 |
| 3,822,791 | A * | 7/1974 | Eiler | 212/178 |
| 4,154,316 | A * | 5/1979 | Kokkila et al. | 180/14.1 |
| 4,165,005 | A * | 8/1979 | Jokinen | 212/304 |

(Continued)

FOREIGN PATENT DOCUMENTS

DE 66 10 504 U1 5/1974

(Continued)

*Primary Examiner*—Paul N Dickson
*Assistant Examiner*—Marc A Scharich
(74) *Attorney, Agent, or Firm*—Patent Central LLC; Stephan A. Pendorf

(57) ABSTRACT

A mobile concrete pump comprising a structural frame (14) mounted on the undercarriage (10) of a truck chassis (12), a boom stand (22) that is provided on the structural frame (14) and that is rotatable about a vertical axis (20) and a concrete distribution boom (24) configured in the form of multi-arm articulated boom (24). The concrete distributing boom consisting, for example, of six arms, which arms can rotate with respect to one another. In order to make possible the use of a distributing boom with a longer reach, a trailer (32) having its own undercarriage (34) is provided, said trailer being connected to the truck undercarriage (10) by a coupling member (36) in the transport condition. The trailer (32) has a pivot member (40) rotatable about a vertical axis (38) for receiving an arm set (42) that projects beyond the rear end of the truck undercarriage (10) in the transport condition.

22 Claims, 8 Drawing Sheets

U.S. PATENT DOCUMENTS

| | | | | |
|---|---|---|---|---|
| 4,418,713 | A * | 12/1983 | Schlecht | 137/351 |
| 5,029,895 | A * | 7/1991 | Anderson | 280/764.1 |
| 5,829,605 | A * | 11/1998 | Poitras | 212/180 |
| 6,032,809 | A * | 3/2000 | Irsch | 212/181 |
| 6,390,504 | B1 * | 5/2002 | Fetzer | 280/763.1 |
| 6,631,817 | B1 * | 10/2003 | Fleagle et al. | 212/301 |
| 6,983,763 | B2 * | 1/2006 | Benckert et al. | 137/615 |
| 7,398,981 | B1 * | 7/2008 | Ener et al | 280/86.5 |
| 7,478,834 | B2 * | 1/2009 | Schlecht | 280/763.1 |

FOREIGN PATENT DOCUMENTS

| | | | |
|---|---|---|---|
| DE | 39 27 268 | C1 | 2/1991 |
| GB | 1 553 121 | | 9/1979 |
| WO | WO 94/08111 | A1 | 4/1994 |

* cited by examiner

A
1
2
B
24/5
10

A'
1'
24/6
44
B'/A
2'/1
42'
4/3
3'/2
C'/B
32
10

A''
1''
24/7
B''/A'
2''/1'
42''
3''/2'/1
4''/3'/2
5''/4'/3
32
10

A
B
1
2
10
12
14
24/7
32
42
44
Arm 1
Arm 2
Arm 3
Arm 4
Arm 5
Arm 6
Arm 7
A/90°
B/270°
C/270°
D/180°
E/180°
F/250°
G/210°

MOBILE CONCRETE PUMP WITH DISTRIBUTING BOOM

CROSS REFERENCE TO RELATED APPLICATION

This application is a national stage of PCT/EP2004/006038 filed Jun. 4, 2004 and based upon DE 103 28 770.1 filed Jun. 25, 2003 under the International Convention.

BACKGROUND OF THE INVENTION

1. Field of the Invention

The invention concerns a mobile concrete pump with a structural frame mounted on the undercarriage of a truck chassis, supportable upon a substrate with lifting up of the undercarriage of the truck, with a boom stand rotatable about a vertical axis provided on the structural frame and a concrete distribution boom in the form of a multi-arm articulated boom including a first boom arm pivotable at a first articulation linkage with horizontal articulation axis relative to the boom stand and additional boom arms pivotable relative to each other about horizontal articulation axis at articulation linkages.

2. Related Art of the Invention

Concrete pumps of this type receive concrete brought in to construction sites by transport vehicles, and convey the concrete via the distribution boom to a site in need of concrete. Conventionally the concrete pumps are mounted upon multi-axle chassis with continuous rigid framework. For heavy vehicles with total capacities of greater than 24 tons multi-axle heavy duty chassis with oversized axle loads are necessary. These can travel on public roads only with special permission and cannot use many light duty roads and bridges. It is further known in the art of mobile concrete pumps of the above described type (EP-B-0038954) to use the semi-trailer of a tractor trailer as the truck undercarriage for the concrete pump and the distribution boom. Therewith, while maintaining the prescribed weight limit of the total tractor trailer, an increase in the range covered by the distribution map can be achieved, and this without loss of balance safety despite the comparatively light mode of construction of the semi-trailer. This is made possible thereby, that the tractor trailer with its weight of approximately 7 to 9 tons is lifted off of the ground and utilized as ballast for stabilization of the distribution boom. However, here also the transportation department regulations establish vehicle length and height limitations, which prevent a further increase in the range.

SUMMARY OF THE INVENTION

Beginning therewith it is the task of the present invention to so improve the known mobile concrete pumps of the above described type in such a manner that, with maintaining of the permissible axle loads and construction heights in the transport configuration, a significant increase in the range of the distribution boom can be achieved.

The inventive solution is based primarily upon the idea, that a trailer is provided, which has its own undercarriage and in the transport configuration is connectible with the truck undercarriage via a coupling arm. The inventive trailer includes a pivot mount rotatable in the vertical axis for receiving the section of the set of arms extending, when folded in the transport configuration, beyond the back end of the truck chassis, and which is comprised of the second boom arm which is unfolded in the extended position of the second articulation linkage relative to the first boom arm and at least one part of the remaining boom arms situated in their folded-in positions relative to the second boom arm, and which together with the first boom arm forms the coupling arm. Thereby a significant increase in the reach of the concrete distribution is achieved, wherein simultaneously in the transport configuration the department of transportation set legally permissible vehicle length, vehicle height and axle load are not exceeded.

In order, despite the longer vehicle length in the transport configuration, to also negotiate relatively tight corners without collision, it is proposed in accordance with a preferred embodiment of the invention that the vertical axis of the boom stand and the pivot mount, in the transport configuration, form three rotation axis of the coupling arm. A further preferred embodiment of the invention envisions that in the transport configuration the first articulation linkage between the boom stand and the first boom arm in its position facing backwards counter to the direction of travel of the truck undercarriage is secured to the structural frame and the second articulation linkage is freely pivotable about its articulation axis. Thereby it is achieved, that the truck undercarriage of the truck chassis and the undercarriage of the trailer exhibit an optimal orientation with the ground both when passing over a hill as well as when passing through a trough. A further improvement in this respect is achieved thereby, that also the pivot mount is limitedly pivotable about an axis running transverse to the trailer longitudinal axis. Besides this the pivot mount should be limitedly pivotable about the vertical axis of the trailer.

It is in principle conceivable, that the trailer can be coupled with the truck undercarriage via a, for example, telescopic tow bar. A further improvement in negotiating curves is achieved thereby, that the trailer is self-steering. The trailer can, for this purpose, exhibit two steering wheels preferably coupled hydraulically. A further improvement is achieved thereby, that the trailer includes a steering device coupled electronically with the steering device of the truck chassis.

In order to make it easier to maneuver the trailer in the decoupled condition, it is advantageous when it includes a motorized wheel drive.

In the operating condition the set of arms laid upon the pivot mount of the trailer is raised. For driving while at the construction site the set of arms can be pivoted against the first boom arm and be rested upon the truck undercarriage. In this manner a boom configuration conceived for moving on the construction site is employed, the folded together condition being too high for the travel upon public roads, but possible and permissible for movement limited to the construction site. In this manner it is possible to utilize sets of arms, of which the range in the operating configuration is greater than 70 meters, and to transport them in road traffic. Therein it is of advantage, when the trailer in the decoupled condition can be driven onto or lifted together with the truck undercarriage as ballast. In this case the trailer provides a support function both during transport and in the operating configuration. The pump unit with material supply container, which on the outlet side is connected with a conveyor line provided with the articulated boom, is usefully provided upon the truck undercarriage side structural frame.

Basically it is however possible that the pump unit with material supply container is provided upon the trailer and in the operating configuration is connectable on its outlet side with a concrete conveyor line provided with the articulated boom.

The boom arms of the articulated boom are preferably connected with each other in combined ZRZ- or RZRZ-folds. Therein the articulated boom is at least four arm, preferably six or seven arm. The high number of arms of the articulated boom only makes sense with regard to control technology when the arms in the operating configuration are not individually, but rather, with electronic support, are collectively controllable in a cylindrical coordinate system (see DE-B-4306127).

Preferably the set of arms in the transport configuration is bolted to the pivot mount of the trailer. The trailer has at least two axles. Depending upon the size of the set of arms it may be useful to employ three to six axle trailers.

BRIEF DESCRIPTION OF THE DRAWINGS

In the following the invention will be described in greater detail on the basis of the illustrative embodiment shown in schematic manner in the figures. There is shown FIGS. 1*a* and *b* A mobile concrete pump with a six arm distribution boom in the travel configuration and in the travel configuration on the construction sites.

DETAILED DESCRIPTION OF THE INVENTION

Figures 1A, 1B, 1C:
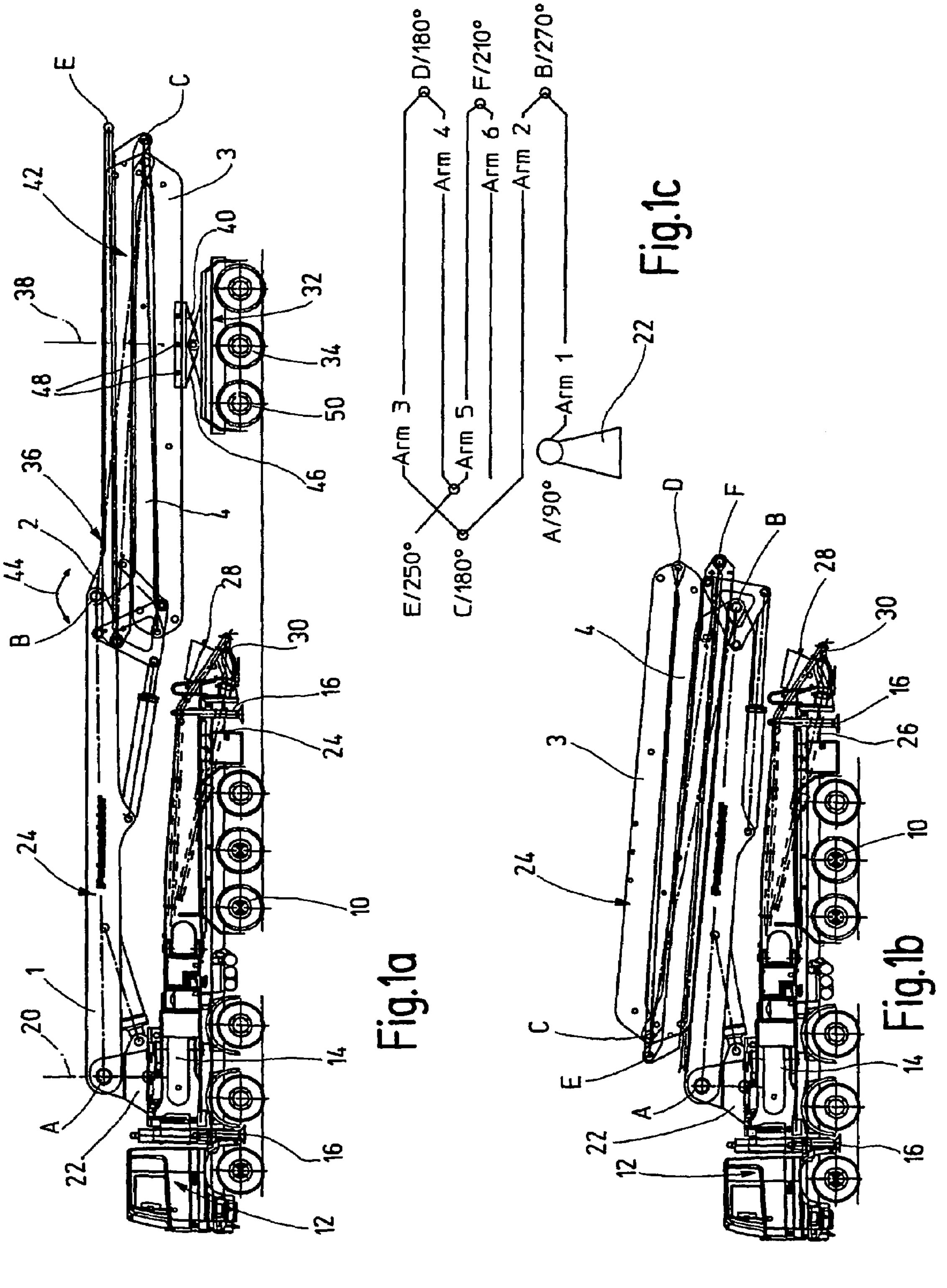
FIG. 1*c* A folding schematic of the articulated boom according to FIGS. 1*a* and *b* in the travel configuration in the construction site.

The mobile concrete pumps shown in the figures include a structural frame 14 mounted on the truck undercarriage 10 of a truck chassis 12, which is supportable with outriggers 16 upon the ground 18 with lifting of the truck undercarriage 10. The structural frame includes a boom stand 22 rotatable about a vertical axis 20 of the truck undercarriage 10, which carries a concrete distribution boom 24 in the form of a multi-arm articulated boom. The articulated boom includes a first boom arm 1 pivotable via a first articulation linkage A with horizontal articulation axis relative to the boom stand 22 and additional boom arms 2 through 6 or 2 through 7 pivotable relative to each other about horizontal articulation axis at articulation linkages B through F or B through G.

The structural frame 14 on the truck undercarriage side carries, besides this, a pump unit 26 in the form of a two cylinder thick matter pump, which operates according to the principle of a tandem pump and in a suction stroke presses a column of concrete suctioned out of a material supply container 28, in a subsequent pressure stroke, into a concrete conveyor line comprised of a pressure pipe 30 and a number of concrete conveyor conduits. Via the conveyor line, which is lead through the rotatable boom stand and with its not shown concrete conveyor conduits is rigged parallel to the boom arms 1 through 6 or 1 through 7 and is rigidly connected with these, the concrete is pumped to the desired location being supplied with concrete.

In the transport configuration the boom arms must be so folded together and positioned upon the truck undercarriage that a vehicle length and vehicle height as prescribed by the department of transportation traffic regulations are not exceeded.

A special feature of the invention is comprised therein, that the mobile concrete pump in the travel configuration exhibits, besides the structural frame carrying truck undercarriage 10, a trailer 32, which includes its own undercarriage 34 and it connectable with the truck undercarriage 10 via a coupling arm 36. The trailer includes a pivot mount 40 rotatable about a vertical axis 38 relative to the undercarriage of the trailer, upon which, in the transport configuration a set of arms 42 extending beyond the back end of the truck undercarriage 10 is supportable. The set of arms 42 is comprised of the second boom arm 2 unfolded in the extended position of the second articulation linkage B relative to the first boom arm 1 and the remaining boom arms 3 through 6 (FIGS. 1, 4*b*, 5) or as the case may be 3 through 7 (FIGS. 4*c*, 6, 7) situated in their folded in position and forms together with the first boom arm 1 the coupling arm 36 between truck undercarriage 10 and trailer 32.

Figures 3A, 3B:
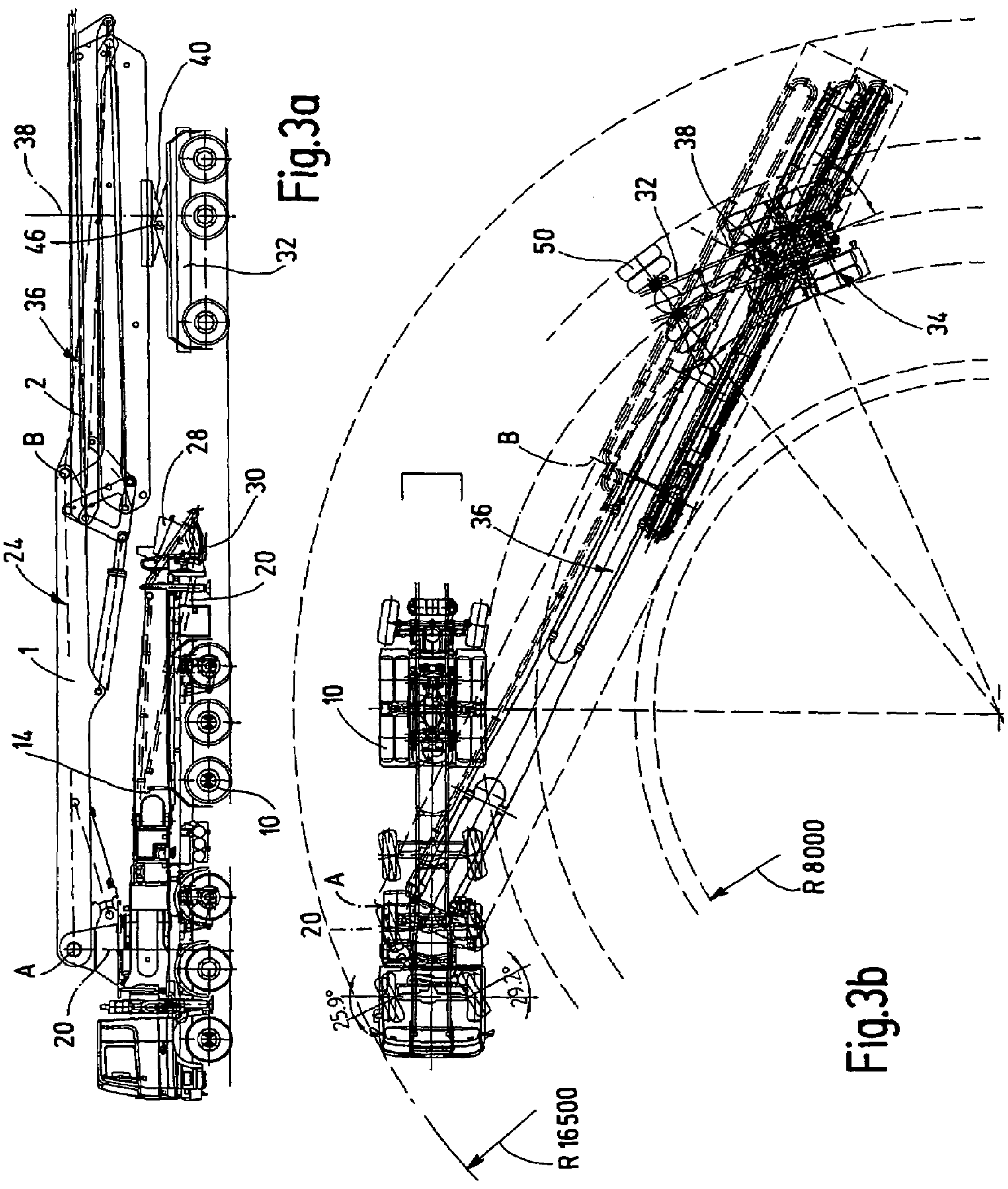
FIGS. 3*a* and *b* The concrete pump according to FIG. 1*a* with slightly modified trailer in a side view and in top view while negotiating a curve.

As can be seen particularly from FIG. 3*b*, the trailer 32 is designed to be self-steering. In the shown embodiment it includes two hydraulic linked steerable wheels 50. The steering device of the trailer is therein preferably electronically coupled with the steering device of the truck undercarriage 10, so that between truck undercarriage 10 and trailer 32 a coordinated negotiation of curve is made possible (FIG. 3*b*). A special feature of the invention is comprised therein, that the vertical axis 20 and 38 of the boom stand 22 and the pivot mount 40 in the transport configuration constitute the free rotation axis of the coupling arm 36. As indicated by the double arrow 44, in the transport configuration the second articulation linkage B as freely pivotable about its articulation axis. Since besides this the pivot mount 40 is limitedly pivotable about an axis 46 extending transverse to the longitudinal axis of the trailer, it is achieved, that the truck undercarriage 10 of the truck chassis 12 and the undercarriage 34 of the trailer 32 maintain optimal orientation to the ground even when passing over a hill or driving through a trough. Since the first articulation linkage A between boom stand 22 and the first boom arm 1 can be locked in its position facing backwards counter to the direction of travel of the truck chassis, in the decoupled condition the set of arms 42 comprised of the boom arms 2 through 6 or as the case may be 2 through 7 can be folded against the first boom arm 1 and be laid against only the truck undercarriage 10 (FIGS. 1*b*, 5*b*, 6*b* and 7*b*). If in the travel configuration according to FIGS. 1*a*, 5*a*, 6*a* and 7*a* already the maximum vehicle height is achieved, then following the supplemental folding-in of the set of arms 42 a vehicle height exceeding that of the street transport regulations will be produced, which is permissible only in the private construction site (configuration of construction site transport).

In the operating condition it must be ensured, that the truck undercarriage is sufficiently braced or supported with its outriggers 16. One improvement in this respect can be achieved thereby, that the trailer 32 in the decoupled condition, as ballast, can be driven onto or lifted together with the truck undercarriage 10.

In the illustrative embodiment shown in FIGS. 1*a* through c the distribution boom is equipped with six boom arms, which in the folded together configuration form a ZRZ-fold; arms 1 through 3 as well as arms 3 through 6 represent therein a Z-fold while the arms 2, 3 and 4 are folded according to the principle of a coil fold. The trailer 32 is in this embodiment three axle, wherein the set of arms 42 in the transport configuration is bolted with the pivot mount 40 at the locations 48.

Figure 2A:
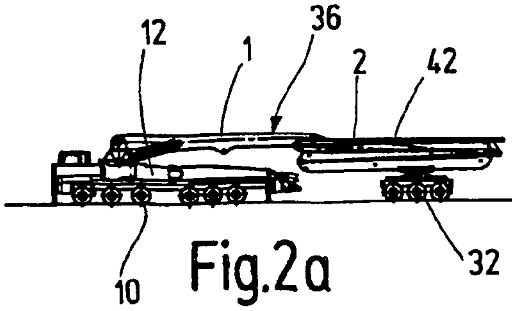
FIG. 2*a-l* The mobile concrete pump according to FIG. 1*a-c* in the transport configuration and in the various unfolding positions of the articulated boom.
Figure 2B:
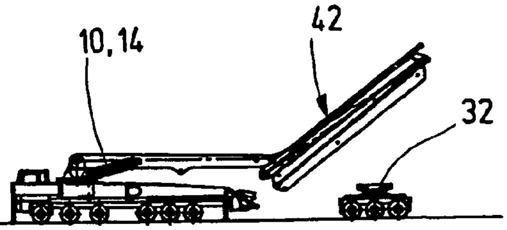
Figure 2C:
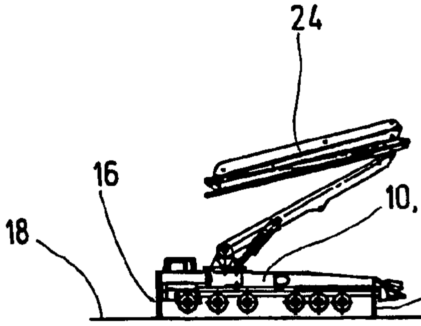
Figure 2D:
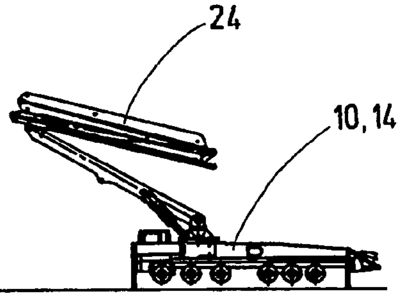
Figure 2E:
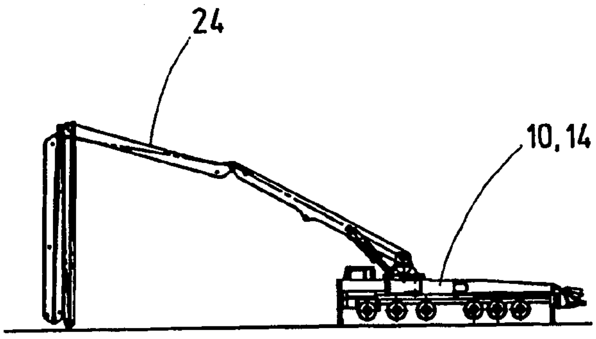
Figure 2F:
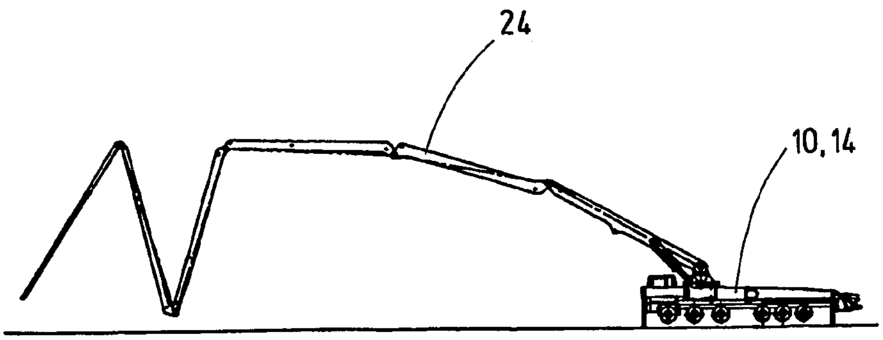
Figure 2G:
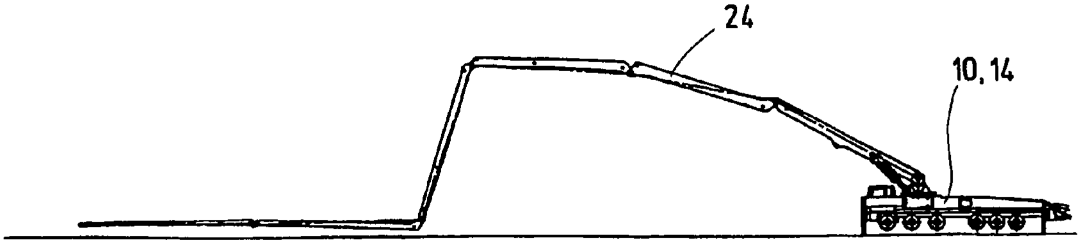
Figure 2H:
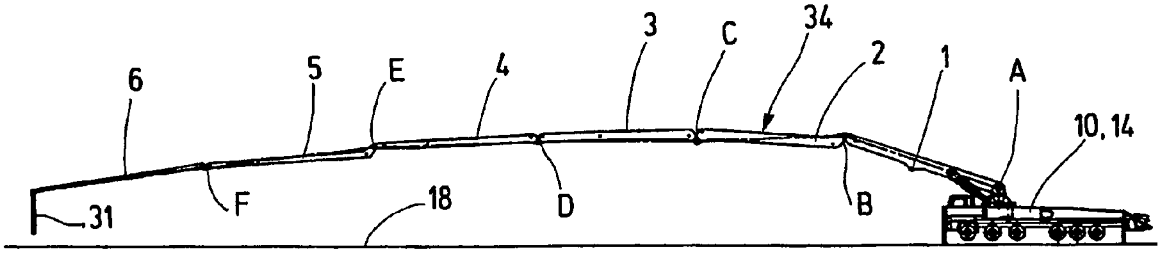
Figure 2I:
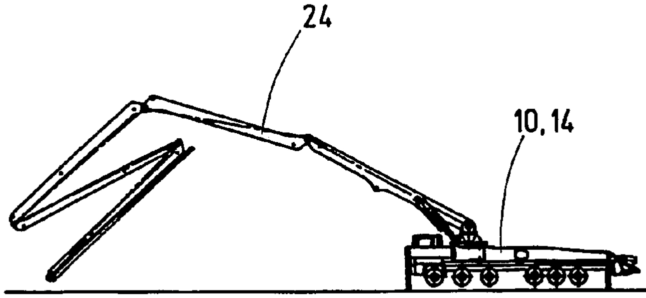
Figure 2J:
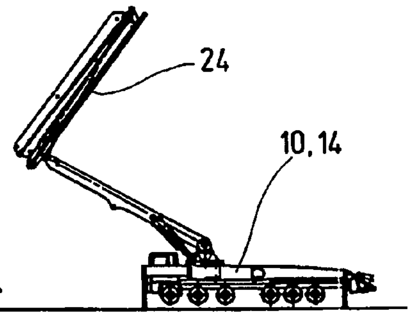
Figure 2K:
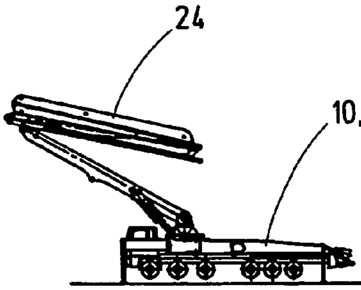
Figure 2L:
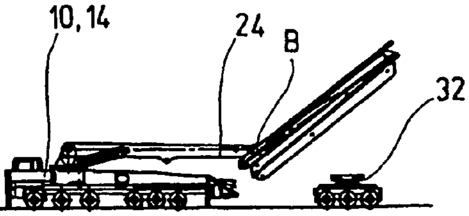

The sequence of FIGS. 2*a* through 21 show the sequence of the unfolding and folding of the distribution boom 24 from the travel configuration (FIG. 2*a*) through the releasing of the set of arms 42 from the trailer 32 (FIG. 2*b*), the supporting upon the ground 18 (FIG. 2*c*) and the subsequent positioning of the concrete distribution boom 24 with end hose 31 in the concrete delivering position (FIG. 2*d* through 2*h*). Following the process of supplying concrete the boom arms 1 through 6 are folded together (FIG. 2*i* through k) with the truck undercarriage 10 still being raised, in order subsequently to be brought into the travel configuration with lowered truck undercarriage 10 in the extended position at linkage B between the first and second boom arms 1, 2 (FIG. 21).

Figures 4A, 4B, 4C:
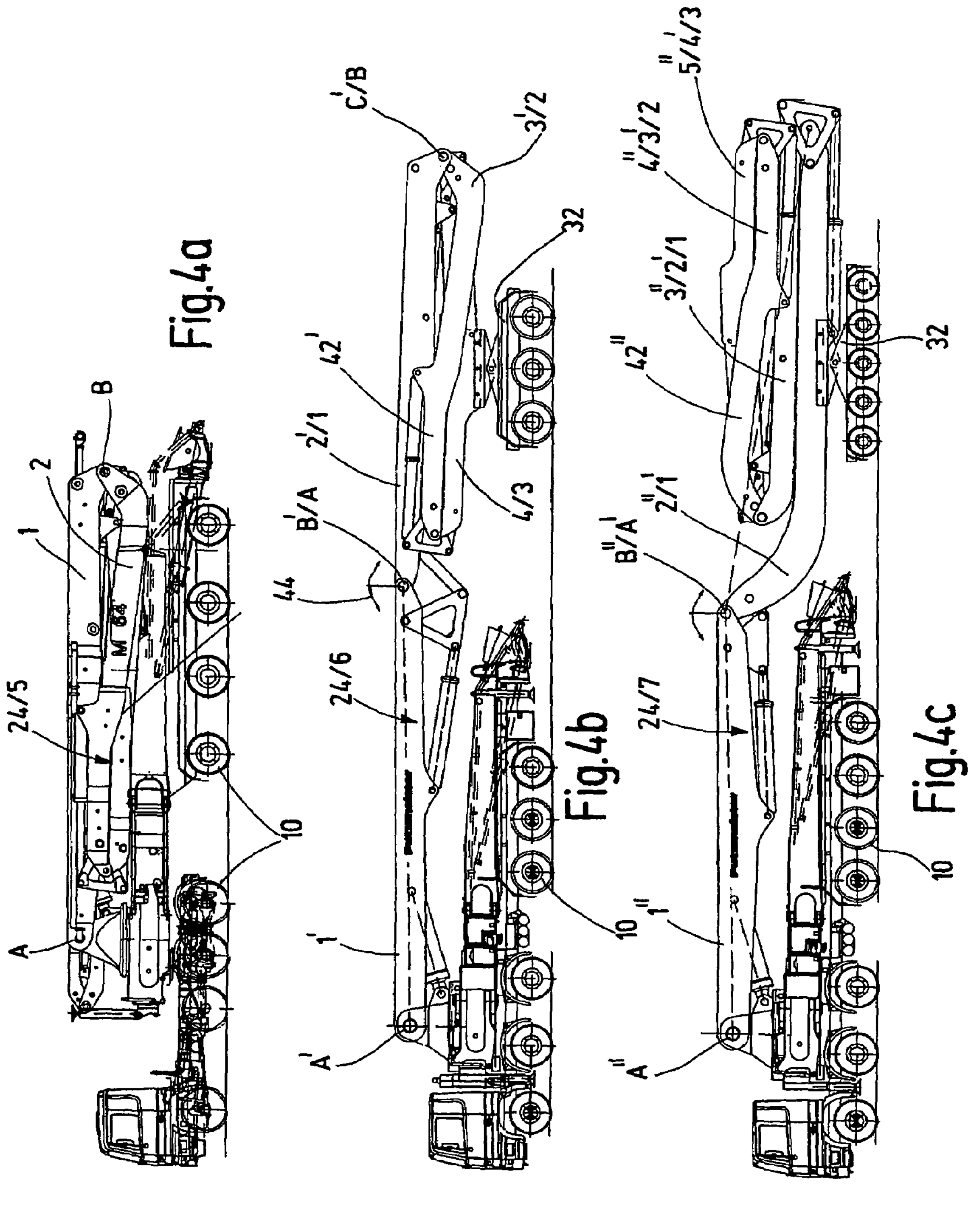
FIG. 4*a-c* Three side-views of mobile concrete pumps with five arm, six arm and seven arm articulated boom.
Figure 5A:
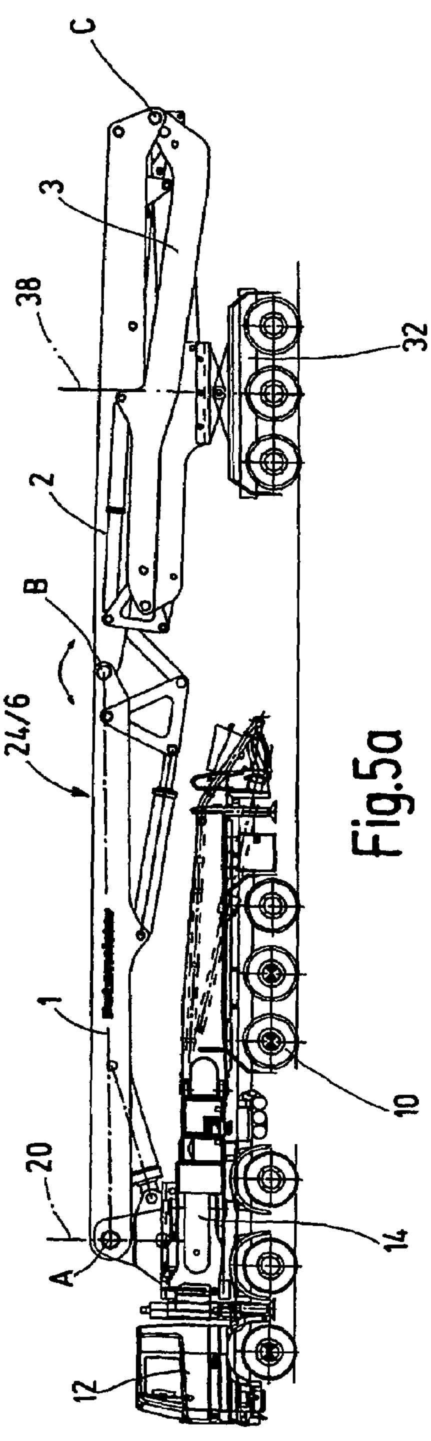
FIGS. 5*a* and *b* A side view of the mobile concrete pump according to FIG. 4*b* in the travel configuration and in the configuration of construction site travel.

FIGS. 4*a* through c show that by a modular construction of the distribution boom, with relatively simple means, with use of the same arm components, a transformation going from a five arm (FIG. 4*a*) to a six arm (FIG. 4*b*) to a seven arm (FIG. 4*c*) distribution boom 24 is possible.

The starting point is the construction shown in FIG. 4*a* comprised of a tractor trailer with a five arm distribution boom 24/5 for a range of approximately 60 m. The use of a tractor trailer in the configuration of a mobile concrete pump is the subject of EP-B-0038954.

If the set of arms 42 shown in FIG. 4*a* is complemented by supplemental boom arm 1', then one arrives at the six arm boom configuration shown in FIG. 4*b*, of which the set of arms 42' according to the invention is supported in the transport configuration on a three axle trailer 32. The remaining arms 1, 2, 3, etc. become new arms 2', 3', 4', etc. In FIG. 4*b* this is indicated by the arm reference numbers 2'/1, 3'/2, 4'/3, etc. The reach of the distribution boom 24 is increased by the supplemental arm 1' to approximately 70 m.

If one folds the total articulated boom according to FIG. 4*b* together and turns it about 180°, then one obtains a set of arms 42", which can be supplemented by new boom arm 1". The arm 2" in FIG. 4*c* must be geometrically adapted (bent) relative to arm 1' in FIG. 4*b*. The previous arms 2', 3', 4' now become arms 3", 4", 5". In FIG. 4*c* this is indicated by arm reference numbers 3"/2'/1, 4"/3'/2, etc. The six arm set of arms 42" is supported upon a five axle trailer 32. Overall a seven arm distribution boom 24/7 shown in FIG. 4*c* provides a range or reach of approximately 80 m.

Figure 5C:
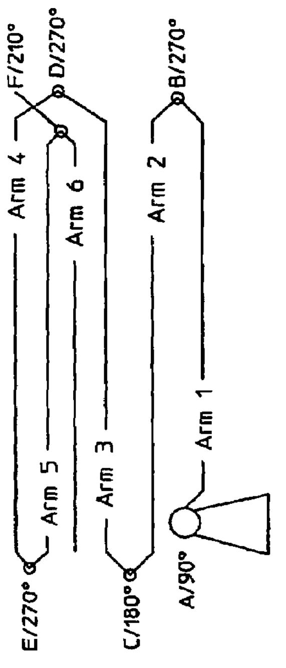
FIG. 5*c* A folding schematic of the articulated boom in the configuration of the construction site travel according to FIG. 5*b;*
Figure 5B:
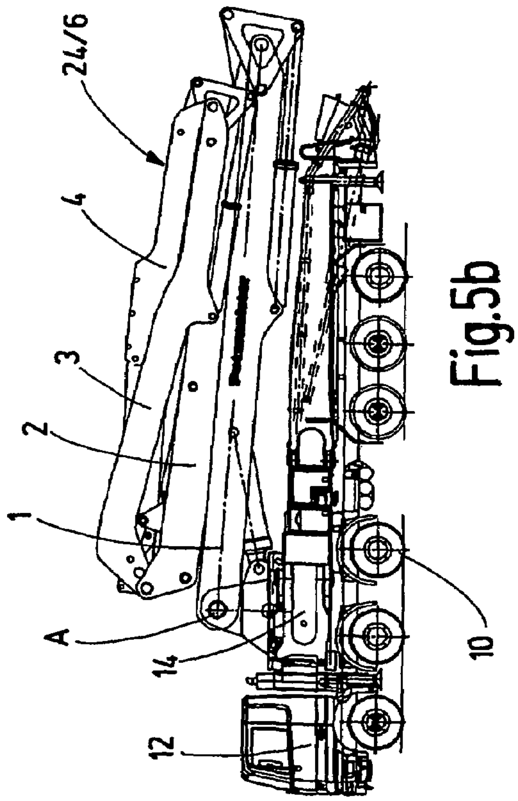

The folding schematic of the six arm distribution boom according to FIG. 4*b* is shown in FIG. 5*c*, besides the representations of the travel configuration and the construction site travel. The arms 1, 2 and 3 and arms 4, 5 and 6 are folded there in the Z-manner, while the group of arms 3, 4 and 5 are folded in the matter of a roll or coil.

Figures 6A, 6B, 6C:
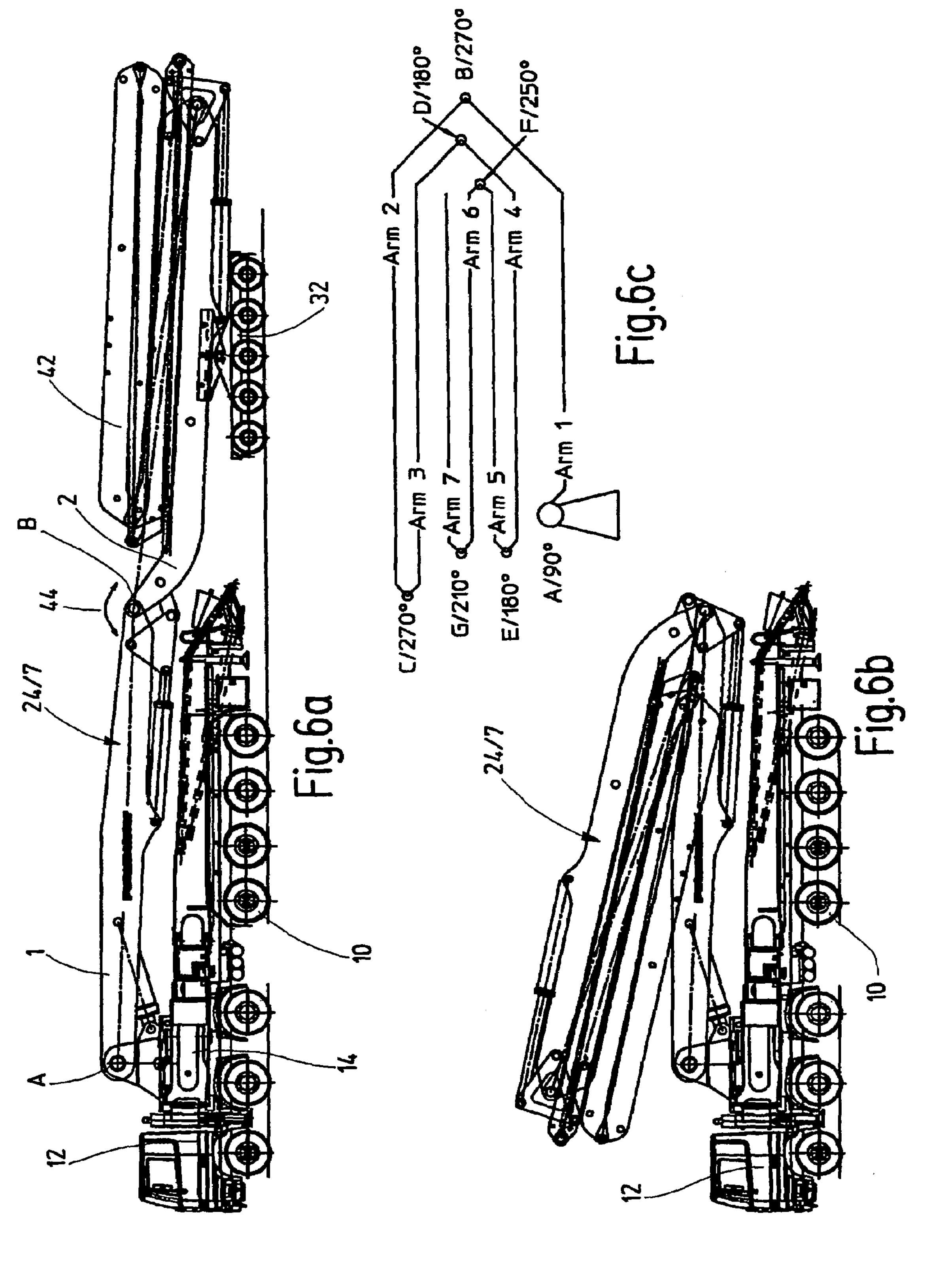
FIGS. 6*a* and *b* A side view of the mobile concrete pump according to FIG. 4*c* in the travel configurationed and in the configuration of construction site travel.
FIG. 6*c* The folding schematic of the articulated boom in the configuration of construction site travel according to FIG. 6*b*.
Figures 7A, 7B, 7C:
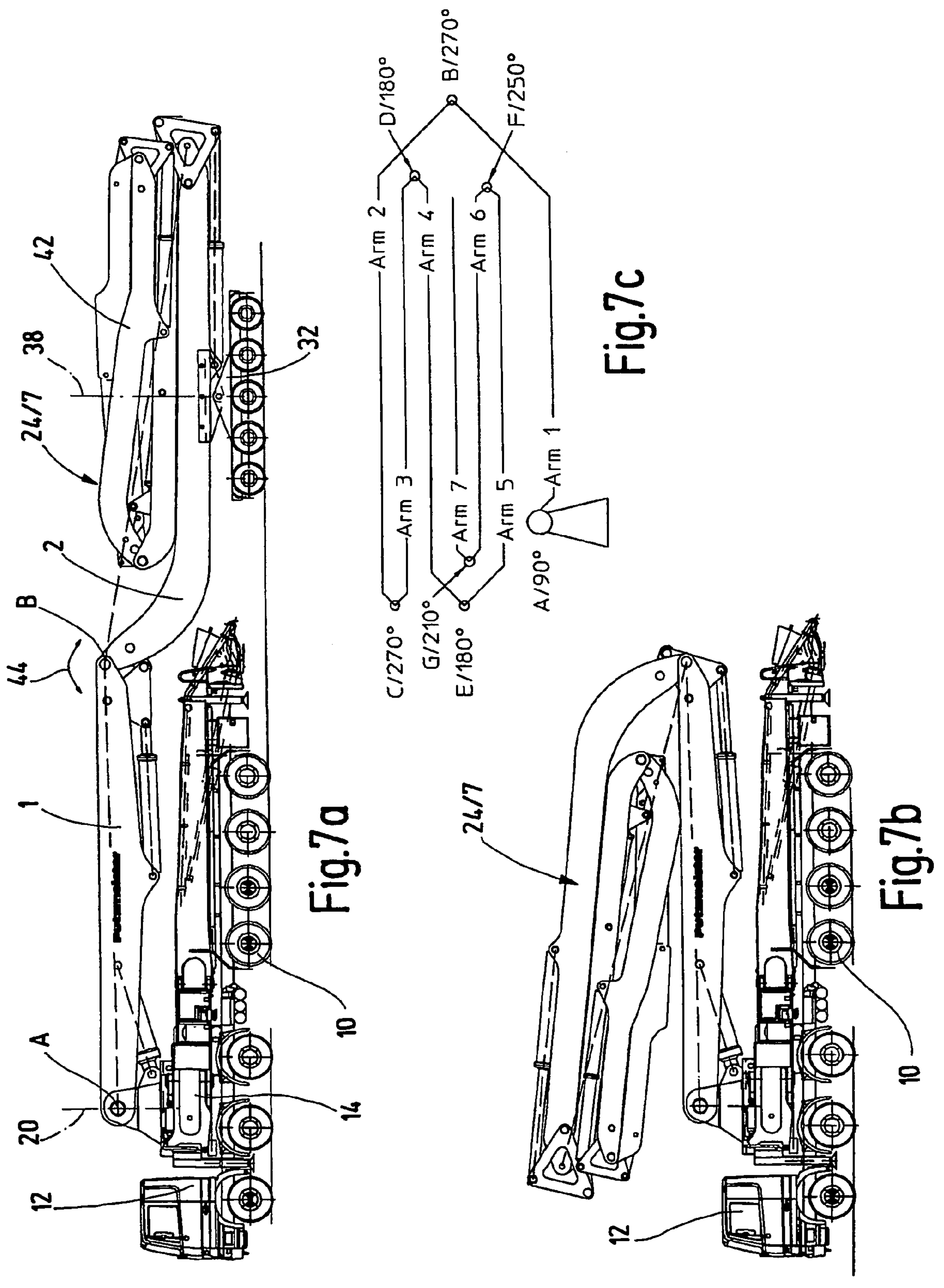
FIGS. 7*a* and *b* A side view of the mobile concrete pump modified relative to FIGS. 6*a* and *b* with seven arm articulated boom in the travel configuration and in the configuration of construction site travel.
FIG. 7*c* A folding schematic of the seven arm articulated boom in the configuration of construction site travel according to FIG. 7*b*.

The seven arm boom configuration shown in FIG. 6*a* through c and 7*a* through c differ essentially in the manner of folding of individual boom arm groups:

FIG. 6*c*: Arm 1, 2, 3: Roll fold
Arm 2, 3, 4: Z-fold
Arm 3, 4, 5: Roll fold
Arm 4, 5, 6, 7: Z-fold
FIG. 7*c*: Arm 1, 2, 3: Roll fold
Arm 2, 3, 4, 5: Z-fold
Arm 4, 5, 6: Roll fold
Arm 5, 6, 7: Z-fold Express reference is made to the pivot angles in linkages A through F or, as the case may be, A through G shown in FIGS. 1*c*, 5*c*, 6*c* and 7*c*.

In summary the following can be concluded: The invention relates to a mobile concrete pump comprising structural frame 14 mounted on the undercarriage 10 of a truck chassis 12, a boom stand 22 that is provided in the structural frame 14 and that is rotatable about a vertical axis 20, and a concrete distribution boom 24 configured in the form of multi-arm articulated boom 24. Said concrete distributing boom consisting, for example, of six arms, has a first boom arm 1 with a first articulation A, which rotates with respect to the boom stand 22, and in addition other boom arms 2 to 6 arranged with articulation linkages B to F, which can rotate with respect to one another. In order to extend the reach of the distribution boom, a trailer 32 having its own undercarriage 34 is provided, said trailer being connected to the running gear 10 by a coupling member 36 in the transport condition. The trailer 32 has a pivot mount 40 rotatable about a vertical axis 38 for receiving an set of arms 42 that projects beyond the rear end of the running gear 10 in the transport condition. The set of arms 42 consists of the second arm 2 extending in the extended position of the second articulation linkage B with respect to the first boom arm 1 and the remaining boom arms 3 to 6 which are folded with respect to the second boom arm 2, and together with the first boom arm 1 forms the coupling member 36, whereby the vertical axes 20, 38 of the boom stand 22 and the pivot mount 40 are configured as free rotational axes of the coupling member 36 in the transport condition while the second articulation B can be freely pivoted about its pivotal axis.

The invention claimed is:

1. A mobile concrete pump with a structural frame (14) mounted on a truck undercarriage (10) of a truck chassis (12), supportable upon the ground when lifting of the truck undercarriage, with a boom stand (22) rotatable about a vertical axis (20) provided upon the structural frame (14) and with a concrete distribution boom (24) in the form of a multi-arm articulated boom, including a first boom arm (1) pivotable relative to the boom stand (22) via a first articulation linkage (A) about a horizontal articulation axis and further boom arms (2 through 7) pivotable relative to each other via articulation linkages (B-G) a bout horizontal articulation axes, and a trailer (32) connectable with the truck undercarriage (10) via a coupling member (36) when in the transport configuration, the trailer including a pivot mount (40) rotatable about a vertical axis for receiving the set of arms projecting beyond the end of the truck undercarriage (10) in a configuration of travel on the road, in which a second boom arm (2) is folded out relative to the first boom arm (1) in the extended position of a second articulation linkage (B) and at least some of the remaining boom arms (3 through 7) configured in the folded configuration together with the first boom arm (1) form the coupling arm (36), and wherein the second articulation linkage (B) is freely pivotable about its articulation axis when in the travel configuration.

2. The mobile concrete pump according to claim 1, wherein the vertical axis (20, 38) of the boom stand (22) and the pivot mount (40) form the free rotation axis of the coupling arm (36) in the transport configuration.

3. The mobile concrete pump according to claim 1, wherein in the transport configuration the first articulation linkage (A) between boom stand (22) and first boom arm (1) is locked in its position facing backwards counter to the direction of travel of the truck undercarriage (10).

4. The mobile concrete pump according to claim 1, wherein the pivot mount (40) is limitedly pivotable about an axis (46) running transverse to the trailer longitudinal axis.

5. The mobile concrete pump according to claim 1, wherein the pivot mount (40) is rotatable about the vertical axis (38) of the trailer (32).

6. The mobile concrete pump according to claim 1, wherein the trailer (32) is coupleable with the truck undercarriage (10) via a, preferably telescopic, tow bar.

7. The mobile concrete pump according to claim 1, wherein trailer (32) is self-steering.

8. The mobile concrete pump according to claim 1, wherein the trailer (32) includes at least two, preferably hydraulically, coupled steering wheels (50).

9. The mobile concrete pump according to claim 7, wherein the trailer (32) includes a steering device coupled electronically with a steering device of the truck undercarriage (10).

10. The mobile concrete pump according to claim 1, wherein the trailer (32) includes a motorized wheel drive.

11. The mobile concrete pump according to claim 1, wherein the trailer (32) in the decoupled condition is drivable unto or liftable with the truck undercarriage (10) as ballast.

12. The mobile concrete pump according to claim 1, wherein the trailer (32) carries a pump unit (26) with material supply container (38), which in the operating condition is connectable on the outlet side with a conveyor line provided on the distribution boom.

13. The mobile concrete pump according to claim 1, wherein the truck undercarriage side structural frame (14) carries a pump unit (26) with material supply container (28), which on its outlet side is connectable with a conveyor line (30) provided on the distribution boom.

14. The mobile concrete pump according to claim 1, wherein the boom arms (1 through 7) of the distribution boom (24) are connected with each other in a combined ZRZ- or RZRZ-fold.

15. The mobile concrete pump according to claim 1, wherein the distribution boom (24) is at least four arm, preferably six or seven arm.

16. The mobile concrete pump according to claim 1, wherein the set of arms (42), when in the travel configuration, are bolted with the pivot mount (40) of the trailer (32).

17. The mobile concrete pump according to claim 1, wherein a set of arms comprised of all boom arms (1 through 7) is supportable upon the truck undercarriage (10) in the folded-in configuration to form a construction site transport configuration.

18. The mobile concrete pump according to claim 1, wherein the trailer (32) is at least a two axle trailer.

19. The mobile concrete pump according to claim 18, wherein the trailer (32) is a three to five axle trailer.

20. The mobile concrete pump according to claim 1, wherein at least one of the remaining boom arms (6) in the travel configuration lies upon the truck undercarriage side structural frame or on the first boom arm.

21. The mobile concrete pump according to claim 20, wherein in the transport configuration the last boom arm (6) of a six arm concrete distribution boom (24) is folded out from the set of arms (42) in the direction of the truck undercarriage (10) and lies thereupon together with the first boom arm (1).

22. A mobile concrete pump with a structural frame (14) mounted on a truck undercarriage (10) of a truck chassis (12), supportable upon the ground when lifting of the truck undercarriage, with a concrete pump provided on the structural frame (14), with a boom stand (22) rotatable about a vertical axis (20) provided upon the structural frame (14) and with a concrete distribution boom (24) in the form of a multi-arm articulated boom connected to said boom stand (22), including a first boom arm (1) pivotable relative to the boom stand (22) via a first articulation linkage (A) about a horizontal articulation axis and further boom arms (2 through 7) pivotable relative to each other via articulation linkages (B-C) about horizontal articulation axes, and a trailer (32) connectable with the truck undercarriage (10) via a coupling member (36) when in the transport configuration, the trailer including a pivot mount (40) rotatable about a vertical axis for receiving the set of arms projecting beyond the end of the truck undercarriage (10) in a configuration of travel on the road, in which a second boom arm (2) is folded out relative to the first boom arm (1) in the extended position of a second articulation linkage (B) and at least some of the remaining boom arms (3 through 7) configured in the folded configuration together with the first boom arm (1) form the coupling arm (36), and wherein the second articulation linkage (B) is freely pivotable about its articulation axis when in the travel configuration.

* * * * *